United States Patent [19]

Pye

[11] 4,204,024

[45] May 20, 1980

[54] ELECTRICAL INSULATION COMPOSITION HAVING LOW POWER FACTOR

[75] Inventor: Richard T. Pye, Middlebury, Conn.

[73] Assignee: Harvey Hubbell, Incorporated, Orange, Conn.

[21] Appl. No.: 915,900

[22] Filed: Jun. 15, 1978

[51] Int. Cl.² ............................ C08K 3/22; C08K 5/14; H01B 3/00

[52] U.S. Cl. .................. 428/379; 260/42.33; 260/45.75 V

[58] Field of Search .......... 260/42.33, 42.15, 45.75 V; 428/379

[56] References Cited

U.S. PATENT DOCUMENTS

| | | | |
|---|---|---|---|
| 2,507,142 | 5/1950 | Chaban | 260/45.75 V |
| 2,874,144 | 2/1959 | Hanford | 260/45.75 V |
| 3,159,596 | 12/1964 | Falcone | 260/42.42 |
| 3,341,475 | 9/1967 | Vandenberg | 260/45.75 V X |
| 3,376,188 | 4/1968 | Clayton et al. | 260/42.15 X |
| 3,405,073 | 10/1968 | Abramoff | 260/45.75 V X |
| 3,425,983 | 2/1969 | Wolfe | 260/42.15 |

OTHER PUBLICATIONS

*Merck Index,* 9th ed. (1976), pp. 709–711.
"Exxon EMD-721 Ethylene-Propylene Elastomer," Exxon Technical Bulletin.

*Primary Examiner*—Sandra M. Person

[57] ABSTRACT

There is disclosed an elastomeric dielectric composition with very low dielectric loss factor which consists essentially of 100 parts by weight of an ethylene-propylene elastomer, from 0.25 to 1 part by weight of a vinyl silane, from 0.1 to 2 parts by weight of lead peroxide, up to 40 parts by weight of zinc oxide, from 1.5 to 4 parts by weight of a peroxide curing agent and an effective amount of inhibitor for said peroxide curing agent.

12 Claims, No Drawings

ELECTRICAL INSULATION COMPOSITION HAVING LOW POWER FACTOR

This invention relates to ethylene-propylene elastomer compositions which are useful as electrical insulation materials.

Ethylene-propylene elastomers are well known in the art for use in preparing compounds for the insulation of wire and cables. In the conventional manufacture of wire and cables employing such insulation material, mineral fillers such as clay or talc, a curing agent and other additives are admixed with the ethylene-propylene elastomers, the compounded admixture is then fabricated over a metallic conductor as an insulation coating and then cured to form a crosslinked coating.

It is well known to those skilled in the art that the power factor of a dielectric material, which is an indication of the energy loss occurring therein when it is subjected to an alternating electric field, influences the power loss from transmission lines. Ethylene-propylene elastomers per se have excellent properties, e.g., polyethylene has a power factor of only about 0.03%. However, ethylene-propylene elastomers per se are not suitable for wire coating applications since they do not extrude satisfactorily for factory processing in wire coating applications and they have unsatisfactory physical properties over a typical service temperature range. Accordingly, it is common to add materials known as crosslinking agents such as peroxide or sulfur, reinforcing fillers such as clay or talc, to improve the physical properties, such as cold and hot tensile strength, deformation resistance and resistance to degradation by ultraviolet light, and to improve the processability of the composition. Unfortunately, as pointed out in U.S. Pat. No. 3,425,983, the addition of the usual fillers undesirably increases the power factor of the dielectric composition and the type of crosslinking agent will influence the power factor.

It is an object of this invention to provide a high quality electrical insulating composition comprising an ethylene-propylene elastomer which has an exceptionally low power factor.

It is a further object of this invention to provide such a composition which does not contain the usual clay or talc fillers with the resultant high power factor.

These and other objects are accomplished by the practice of this invention which, briefly, comprises providing an elastomeric dielectric composition with very low dielectric loss factor which consists essentially of 100 parts by weight of an ethylene-propylene elastomer, from 0.25 to 1 part by weight of a vinyl silane, from 0.1 to 2 parts by weight of lead peroxide, up to 40 parts by weight of zinc oxide, from about 1.5 to 4 parts by weight of a peroxide curing agent and an effective amount of inhibitor for said peroxide curing agent.

The ethylene-propylene elastomers used in conjunction with the present invention are well-known in the art. They are prepared by copolymerizing ethylene and propylene monomers using polymerization catalysts. Other ethylenically unsaturated hydrocarbon monomers, such as 1-butene, 1-pentene, 1-heptene, 1-hexene, 1,4-hexadiene, etc., may also be included in the copolymer. Either crystalline or amorphous elastomers are effective in obtaining a low power factor. For higher quality physical properties, the crystalline type is preferred.

Ethylene-propylene elastomers are available from a number of companies under various trade names such as Royalene from Uniroyal; Vistalon from Exxon Chemicals; Nordel from E. I. DuPont de Nemours & Co.; Epsyn from Copolymer Corp.; and Epcar from B. F. Goodrich Co. Copolymers of ethylene and propylene may have the ratio of these monomers varied so as to yield either an amorphous polymer or polymers exhibiting varying degrees of crystallinity. An especially preferred material is an ethylene-propylene elastomer with a high ethylene content, known as a crystalline ethylene-propylene elastomer. Crystalline ethylene-propylene elastomers are available from DuPont under the trademark Nordel 2722 and from Exxon under the trademark Vistalon 707 and 721.

Another preferred material for use in the practice of this invention is an ethylene-propylene elastomer which is a terpolymer of ethylene, propylene and a nonconjugated diene, i.e., 1,4 hexadiene, ethylidene norbornene, dicyclopenta-diene and whose ratio of ethylene to propylene is high enough to yield a polymer exhibiting crystallinity sufficient to yield superior physical properties without requiring extensive use of reinforcing fillers, such as clay. Such ethylene-propylene polymers will have a completely saturated backbone and pendant side chain unsaturation.

To the ethylene-propylene elastomer are added zinc oxide, vinyl silane and lead peroxide in a banbury mixer. The mixing is carried out to achieve a batch temperature of 300°–320° F. The heat promotes chemical reactivity of the vinyl silane and lead peroxide believed to be that of combining with free polar radicals present in the EP rubber and zinc oxide. This results in a lower power factor in the final vulcanized insulation. The vinyl silane used should be one which does not contain a strongly polar group such as an amino radical, a chloro radical or a mercapto radical. The preferred compound is vinyl-tris-($\beta$-methoxyethoxy)silane.

To the above mixture, known as a masterbatch, is added a heat aging stabilizer, such as polymerized trimethyl dihydroquinoline, available under the trade name of Agerite Resin D from the R. T. Vanderbilt Co. Also added at the same time is a peroxide for crosslinking the composites. Suitable peroxides which dissociate with heat to form a free radical(s) that will by hydrogen abstraction or electron transfer cause a crosslink bond to form between two carbon atoms, such as Dicup and Vulkup from Hercules and Lupersol 101 from the Lucidol Division of Pennwall. These peroxides are:

Dicup=dicumyl peroxide

Vulkup=$\alpha,\alpha'$-bis(ter-butylperoxy)diisopropyl-benzene

Lupersol 101=2,5-bis-(ter-butylperoxy)-2,5-dimethyl-hexane

In accordance with this invention, the usual fillers normally required for physical reinforcement to provide physical properties such as cold and hot tensile strength and deformation resistance and to improve resistance to degradation by ultraviolet light have been replaced with zinc oxide without detracting from the power factor of the composition. In the past, although zinc oxide has been used in ethylene-propylene compositions as a sulfur cure activator, a heat aging stabilizer, or a UV screen, it has not been previously recognized that it will also provide a degree of physical reinforcement and permit compounding to a very low power factor. Moreover, the use of lead peroxide in this particular composition of ingredients contributes significantly to obtaining an insulation with a very low power factor and maintaining such in 90° C. water. Further, the use of lead peroxide instead of the more conventionally used red lead or $Pb_2O_3$ results in an insulation which is free of a pinkish or reddish color. The use of lead peroxide as an electrical stabilizer in ethylene-propylene insulating compounds has been avoided on a commercial scale due to processing problems such as premature crosslinking and resultant nonuniform rheological properties of the compound. An object of this invention is to show that this ingredient can be used at a very low concentration and provide a practical processing compound with stable electrical properties in 90° C. water.

The following examples illustrate the best modes contemplated for carrying out this invention:

EXAMPLE 1

There are mixed together thoroughly in a banbury mixer 100 parts by weight of Nordel 2722 ethylene-propylene-1,4-hexadiene copolymer, 0.5 part by weight of vinyl-tris($\beta$-methoxyethoxy)-silane, 0.2 part by weight of lead peroxide, 14 parts by weight of zinc oxide, 0.5 part by weight of polymerized trimethyl dihydroquinoline (Agerite Resin D) and 2.3 parts by weight of a mixture of the para and meta isomers of $\alpha,\alpha$-bis(t-butylperoxy)diisopropylbenzene (Vulkup). Nordel 2722 is a crystalline copolymer of ethylene, propylene and 1,4-hexadiene with a completely saturated backbone and pendant side chain unsaturation. It has a Mooney viscosity of 25° at 250° F. and a specific gravity of 0.85. The batch of ingredients is heated to a temperature of 300°-320° F. during mixing. The composition is then used as feed stock for a conventional extruder for extruding insulating material on wire. The material is extruded on wire at a temperature of about 230° F. and is then vulcanized by passing it through a heated atmosphere at 400° F. under a pressure of 50 to 250 p.s.i.g. The vulcanized insulation has a specific gravity of 1.0, a tensile strength of 1,000–1,300 p.s.i., an elongation of about 450%, a high modulus, an AC dielectric strength of about 800 v-mil, a power factor of $0.3 \pm 0.1\%$ at 90° C. in hot water under 60 Hz AC and is stable for an extended time under these conditions. The power factor is measured at 80 volts per mil stress of a sinusoidal alternating current applied to wire insulated with the composition. The insulation has a high modulus, is "rubbery" and it does not have the red or pinkish color associated with insulations containing $Pb_2O_3$ (red lead). Additional features of this composition are outstanding life at elevated temperatures and resistance to products of electrical discharge encountered during high voltage AC service. This combination of properties permits this insulating composition to be used on cable designed for 138 KV AC service suitable for continuous operation at 90° C.

EXAMPLE 2

The process of Example 1 is repeated except that Nordel 2722 is replaced with an equal amount of Vistalon 721, an ethylene-propylene elastomer having a Mooney viscosity at 127° C. of 13 and a specific gravity of 0.87. An insulated wire was prepared from this composition as described in Example 1. The insulation has a power factor of $0.3 \pm 0.1$ in 90° C. water under 60 Hz AC.

EXAMPLE 3

The process of Example 1 is repeated except that Nordel 2722 is replaced with an equal amount of Vistalon 707, an ethylene-propylene elastomer having a Mooney viscosity at 100° C. of 35–45, and a specific gravity of 0.86. An insulated wire was prepared from this composition as described in Example 1. The insulation has a power factor of $0.3 \pm 0.1$ in 90° C. water under 60 Hz AC.

I claim:

1. An elastomeric dielectric composition with very low dielectric loss factor which consists essentially of 100 parts by weight of an ethylene-propylene elastomer, from 0.25 to 1 part by weight of a vinyl silane, from 0.1 to 2 parts by weight of lead peroxide, up to 40 parts by weight of zinc oxide, from about 1.5 to 4 parts by weight of a peroxide curing agent and an effective amount of inhibitor for said peroxide curing agent, said zinc oxide being the sole filler in said composition.

2. A composition as defined in claim 1 wherein said vinyl silane is vinyl-tris($\beta$-methoxyethoxy)-silane, said peroxide curing agent is a mixture of the para and meta isomers of $\alpha,\alpha'$-bis(t-butylperoxy)-isopropylbenzene and wherein the effective amount of said inhibitor comprises 0.5 to 2 parts by weight of polymerized trimethyl-dihydroquinoline.

3. A composition as defined in claim 1 wherein said ethylene-propylene elastomer is a terpolymer of ethylene-propylene and a nonconjugated diene in which the ratio of ethylene to propylene is high enough to yield a polymer exhibiting crystallinity sufficient to yield superior physical properties without requiring extensive use of reinforcing fillers, said elastomer having a completely saturated backbone and pendant side chain unsaturation.

4. A composition as defined in claim 3 wherein said ethylene-propylene elastomer is a crystalline copolymer of ethylene-propylene and 1,4-hexadiene with a completely saturated backbone and pendant side chain unsaturation.

5. A composition as defined in claim 1 wherein said elastomer is a copolymer of ethylene and propylene.

6. A composition as defined in claim 5 in which the ratio of ethylene and propylene is varied so as to yield either an amorphous polymer or polymers exhibiting varying degrees of crystallinity.

7. An electrical conductor coated with a composition as defined in claim 1.

8. An electrical conductor coated with a composition as defined in claim 2.

9. An electrical conductor coated with a composition as defined in claim 3.

10. An electrical conductor coated with a composition as defined in claim 4.

11. An electrical conductor coated with a composition as defined in claim 5.

12. An electrical conductor coated with a composition as defined in claim 6.

* * * * *